Patented Mar. 13, 1923.

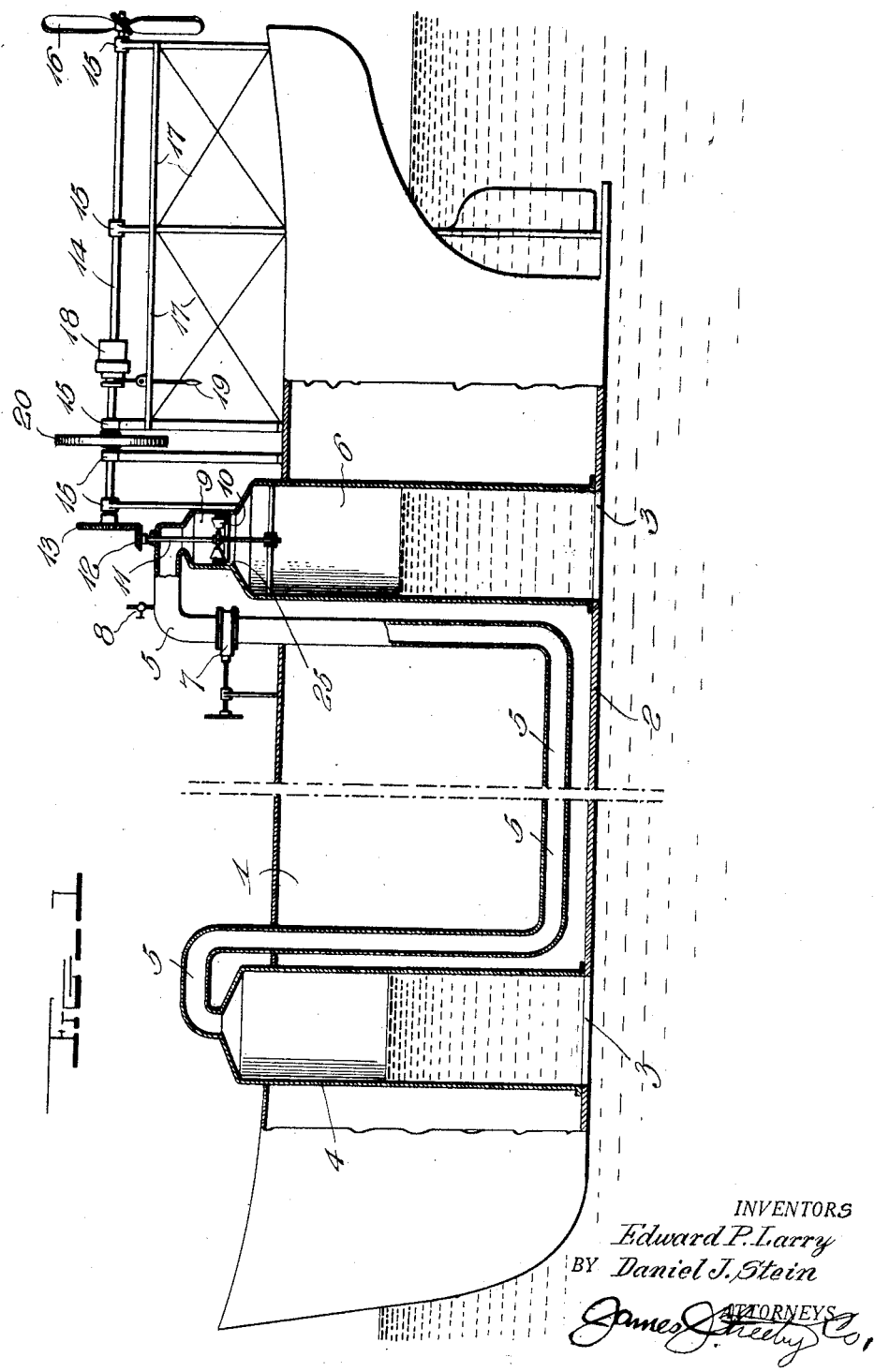

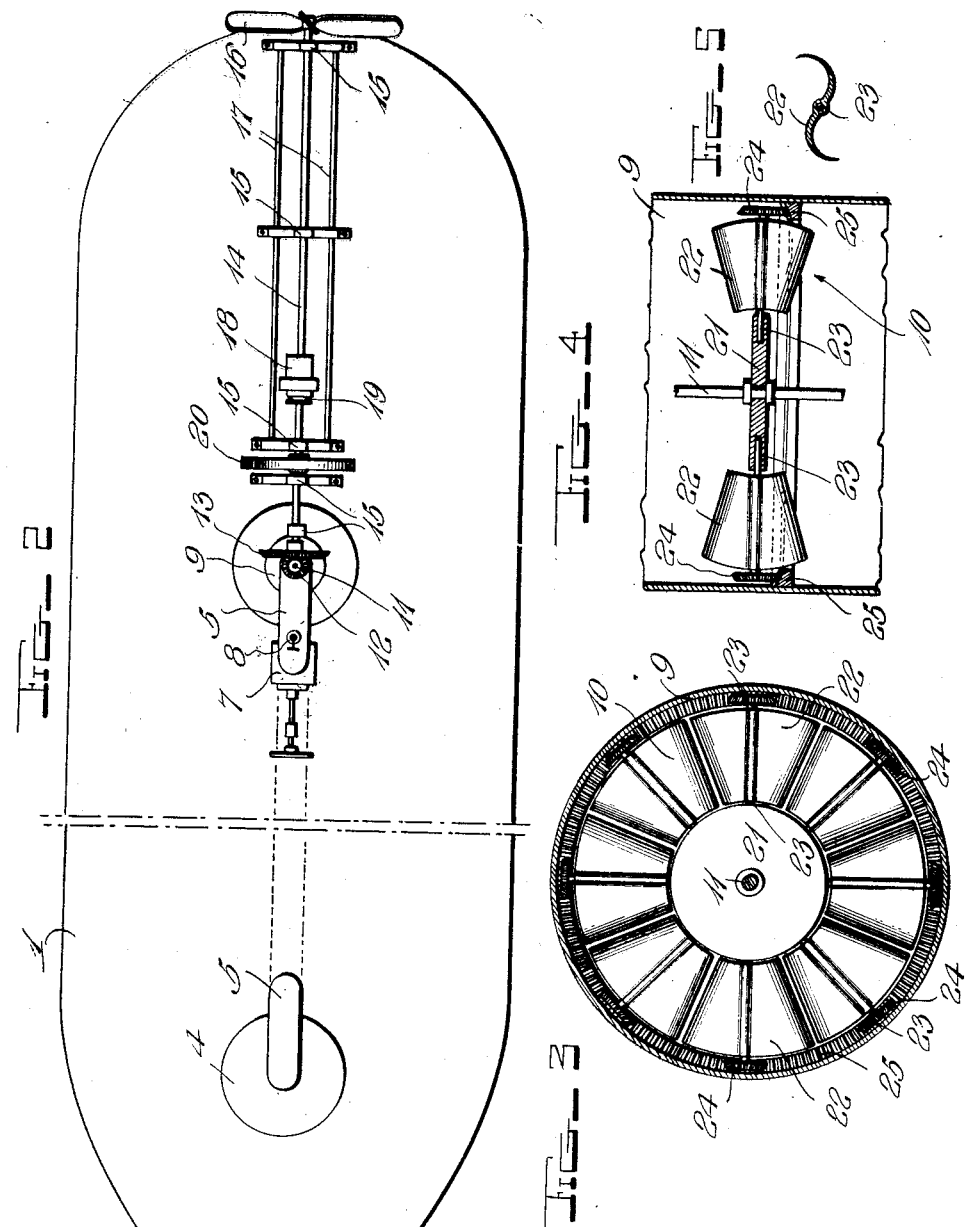

1,448,029

UNITED STATES PATENT OFFICE.

EDWARD P. LARRY AND DANIEL J. STEIN, OF NEW ORLEANS, LOUISIANA.

WATER-MOVEMENT-POWER VESSEL.

Application filed April 17, 1922. Serial No. 553,656.

*To all whom it may concern:*

Be it known that we, EDWARD P. LARRY and DANIEL J. STEIN, citizens of the United States, residing at New Orleans, in the parish of Orleans and State of Louisiana, have invented new and useful Improvements in Water-Movement-Power Vessels, of which the following is a specification.

Our present invention pertains to vessel propulsion and it contemplates the provision of means so constructed and arranged in a vessel whereby the rise and fall of the vessel due to the movement of water will tend to move the vessel forwardly and rearwardly as occasion may demand.

The invention further contemplates the provision of a vessel that may be propelled through the water with practically no cost and with but a small amount of machinery.

The invention in all of its details will be fully understood from the following description and claims when the same are read in connection with the claims accompanying and forming part of this specification, in which:

Figure 1 is a side elevation of a vessel and showing a portion thereof in section.

Figure 2 is a top plan view of the invention.

Figure 3 is a detail horizontal section on an enlarged scale of the power wheel of our device.

Figure 4 is a longitudinal central section of Figure 3.

Figure 5 is a detail view of one of the power wings of the power wheel.

Similar numerals of reference designate corresponding parts in all the views of the drawings.

Our device is arranged in a vessel 1 and in the keel or bottom 2 thereof we arrange forward and aft the openings 3, and in the forward opening 3 we place the tank 4 while in the aft opening 3 we place a tank 6. The said tanks 4 and 6 are connected to and are in communication with each other by means of the pipe conduit 5. This pipe 5 is of the construction illustrated and arranged in the pipe 5 is a gate-valve 7 and a second valve 8. At its end above the tank 6 the pipe 5 is provided with the housing 9 of a power-wheel (shown as a whole) and indicated by 10 in Figure 1.

The power-wheel 10 is arranged on a shaft 11 having at its upper end the geared pinion 12 that meshes with a large gear 13 of the shaft 14 and said shaft 14 is journaled in the bearings 15 and on its outer end the shaft 14 is provided with a propeller 16 whereas near its forward end with respect to the forward direction of travel of the vessel, the shaft 14 is provided with a flywheel 20. In order to properly position and retain the shaft 14 on the vessel we brace the shaft and its elements by means of the rods 17.

The said shaft 14 is adapted for rotation under normal conditions in one direction but in order to reverse the direction of rotation we provide the reverse gear 18 of well known construction. which gear is provided with a reversing lever 19.

By reference to Figures 3 and 4 it will be seen that the power-wheel 10 comprises the hub 21 to which is secured a series of shafts 23 and mounted on the shafts 23 are blades 22 of S-shape in cross-section.

The power-wheel is provided with a ring gear 25 meshing with the gears 24 arranged on the ends of the shafts 23.

In the use of the invention, the rise and fall of the vessel caused by movement of water at sea will compress air in the tanks 4 and 6. The submerging of the forward end of the vessel and the subsequent submerging of the aft of the vessel will force the air through the tube 5 and against the blades 22 of the power-wheel 10. The said blades will revolve and cause the gears 24 to engage the gears 25 and thus actuate shaft 23 and shaft 11. Manifestly movement of shaft 11 will actuate propeller shaft 14 and thus impart forward movement of the vessel.

The direction of rotary motion of shaft 14 may be changed by means of the gear 18 to change the direction of travel of the vessel.

The gate valve 7 is used to regulate the pressure of air on the blades and may be entirely closed in case of emergency or to stop the vessel.

The valve 8 at the head of the pipe 5 is for the purpose of releasing air and to allow a certain amount of water to enter the tanks 4 and 6 which tanks are air-tight.

The propeller 16 is illustrated as above the water-line to overcome the friction when the vessel is being towed, but we do not wish to be limited to the point at which the propeller is arranged on the vessel as the power-wheel construction may be used with a propeller placed under water.

We would distinctly have it understood that if the hull of the vessel is damaged the valve 7 may be closed and hence the buoyancy of the vessel increased and this valve 7, valve 8 and lever 19 are adapted for operation from the cabin of the vessel.

Having described our invention, what we claim and desire to secure by Letters-Patent is:—

1. In a wave motor, the combination of a vessel, openings formed in the hull thereof, tanks having their lower ends opened and arranged in the openings of the hull, a conduit extending from one to the other of the tanks, a gate-valve arranged in the conduit, a pressure valve arranged in the conduit, a power wheel communicating with the conduit, a shaft actuable by the power wheel, a pinion formed on one end of the shaft and a propeller shaft having a fly wheel and a gear that meshes with the pinion of the first named shaft.

2. In means for propelling a vessel, the combination of tanks having open lower ends, a conduit extending from one to the other of the tanks, a valve for controlling the pressure of air in the conduit during the rise and fall of the vessel, a shaft mounted above and extending into one of the tanks and arranged within a casing that communicates with the conduit, a pinion formed on one end of the shaft, a shaft having a propeller on one end thereof and a gear on the opposite end and adapted to be actuated by the pinion of the first named shaft, a clutch arranged on the second shaft for reversing the direction of travel of the propeller and means secured on the first named shaft and actuable by air passing through the conduit from one to the other of the tanks; said means comprising short shafts, blades formed on the shafts, gears, arranged on the ends of the shafts and adapted to mesh with a ring gear attached to the housing of the power-wheel.

3. In means for propelling a vessel, the combination of tanks, a pipe connecting the tanks, means arranged in the pipe for controlling the pressure of air that passes therethrough, a power wheel mounted within a portion of the pipe and comprising a plate, teeth formed on the upper peripheral face of the plate, blades mounted above the plate and adapted to be rotated by air from the pipe, shafts on which the blades are mounted, gears formed on the ends of the shafts and adapted to mesh with the teeth of the plate, a shaft keyed to the hub, a shaft extending at an angle with respect to the power shaft and adapted to be rotated by the power shaft, propeller arranged on the last named shaft and a reversing lever adapted to change the direction of rotation of the last named shaft.

4. In a wave motor, the combination of a vessel having openings in the lower end thereof, tanks mounted in the openings, a conduit communicating from one to the other of the tanks, a power wheel arranged within the conduit and adapted to be rotated by the passage of air through the pipe, a shaft keyed to the power wheel, a shaft adapted to derive rotary motion from the first named shaft, means for reversing direction of rotation of the propeller shaft, and means for controlling the passage of air through the conduit, and other means for preventing water from entering the tanks and conduit.

5. In a device for the purpose set forth, the combination of a vessel, tanks open at their lower ends and adapted to compress air within a connecting pipe upon the rise and fall of the vessel, a power wheel having blades that are rotated by the passage of air through the pipe, means formed on the shafts to which the blades are secured for imparting rotary motion to the power wheel, a shaft mounted on the power wheel, and means for imparting rotary motion from the shaft to the propeller shaft of the vessel, substantially as and for the purpose set forth.

In testimony whereof we have hereunto set our hands in presence of two subscribing witnesses.

EDWARD P. LARRY.
DANIEL J. STEIN.

Witnesses:
R. G. EUSTIS,
M. E. KNIGHT.